United States Patent [19]

Apostoly et al.

[11] Patent Number: 4,735,232
[45] Date of Patent: Apr. 5, 1988

[54] DEVICE TO REGULATE THE PRESSURE OF A TIRE ON A MOVING VEHICLE

[75] Inventors: Raymond Apostoly; Bernard Ballan, both of Valence, France

[73] Assignee: Precision Mecanique Labinal, Bretonneux, France

[21] Appl. No.: 24,169

[22] Filed: Mar. 10, 1987

[51] Int. Cl.[4] ............................................. B60C 23/00
[52] U.S. Cl. ..................................... 137/494; 137/225; 152/416
[58] Field of Search ................. 137/225, 494; 152/416

[56] References Cited

U.S. PATENT DOCUMENTS 4,598,750  7/1986  Gant ................................. 137/225 X Primary Examiner—Robert G. Nilson
Attorney, Agent, or Firm—Larson and Taylor

[57] ABSTRACT

A device for regulating the pressure of a tire on a moving vehicle includes an inlet channel to be linked to an exterior pressure supply, an outlet channel on the tire and normally closed by a valve head, as well as a mechanism which, responding to the pressure from the supply line, pushes against the valve head to open it. This mechanism includes, within a chamber directly communicating with the supply channel, a moveable assembly one of the surfaces of which is directly submitted to the pressure of the chamber, while the other surface is submitted to the same pressure by means of a calibrated outflow channel or restriction outlet introducing a delay in the establishment of the pressure.

6 Claims, 1 Drawing Sheet

U.S. Patent    Apr. 5, 1988    4,735,232
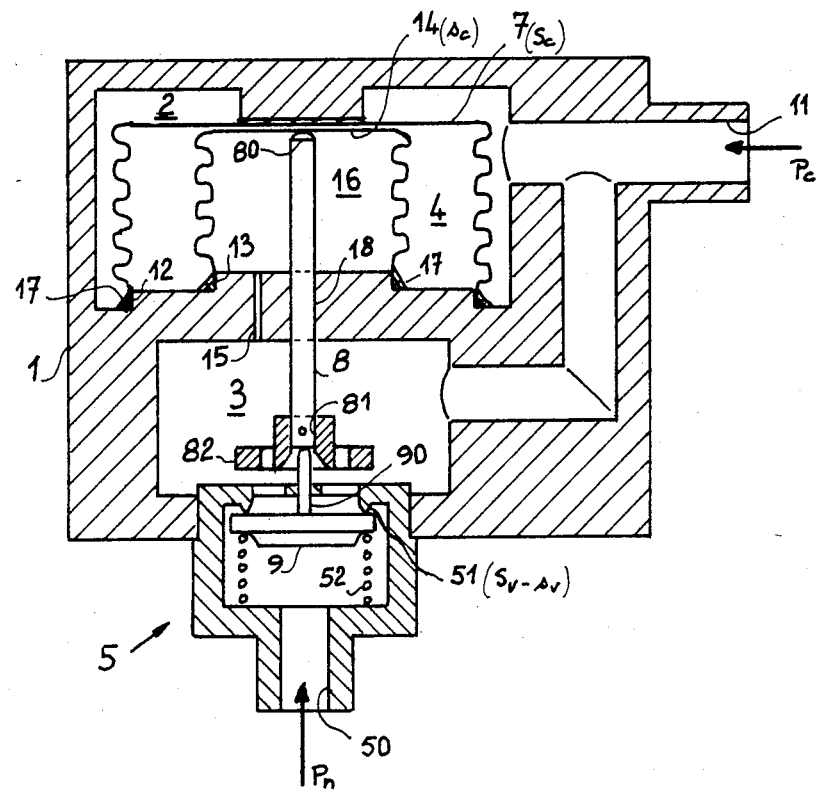

DEVICE TO REGULATE THE PRESSURE OF A TIRE ON A MOVING VEHICLE

FIELD OF THE INVENTION

The present invention concerns valve devices intended to regulate the pressure in tires on a moving vehicle, of a type including a valve the state of which, controlled by an exterior pressure, allows the communication of the said pressure with an outlet channel linked to the tire.

BACKGROUND OF THE INVENTION

In the known devices of this kind, the pressure control valve of the tire should be open during inflation and deflation of the tire to the desired pressure and closed once the pressure in the supply conduit is of the order of 1 bar.

In practice, in order to avoid premature wearing of the rotating joints which lead from the pressure supply in the chassis to the tires, the pressure is normally relieved in the device by a purging system except during the relatively brief periods when the pressure in the tire is being modified.

In addition, these devices, attached to each wheel, should function under extreme conditions of temperature, shocks and vibration, and should remain sealed tight against sand, mud, and all kinds of liquids such as water, oils and naphthas.

To do this, it is known, as described in the French Certificate of Utility No. 82 11002, to make sealed devices without a purging system to communicate with the exterior, and possessing a chamber, called a respiration chamber, isolated from the inlet and outlet chambers by a flexible diaphragm. This chamber contains a spring serving to press the valve head against its seat to close the inlet channel. This valve head is provided with an anti-backflow device which allows the connection between the respiration chamber and the outlet channel to evacuate any excess pressure from the said chamber. However this system has the disadvantage that, in the case of a leak at the level of the diaphragm and because of the presence of the anti-backflow device, all the air can leak out of the tire via the inlet conduit from which the pressure has been relieved during normal driving.

SUMMARY OF THE INVENTION

The device according to the invention has as its aim to avoid this disadvantage. In this invention, the outlet channel, intended to be connected to the tire, is equipped with a valve of the classic sort which the tire pressure maintains closed, the effect of which is that any leak at the level of the device may not cause loss of pressure from within the said tire.

The object of the invention is a device to regulate the pressure of a tire on a moving vehicle, of the kind including a input conduit to be linked to an exterior pressure supply, an outlet channel on the tire and normally closed by a valve head (under pressure from within), as well as a mechanism which is sensitive to the pressure coming from the supply line and thus is capable of opening the said valve head, characterized in that the said mechanism includes, within a chamber directly communicating with the said supply line, a moveable assembly one of the surfaces of which is directly submitted to the pressure of the said chamber, while the other surface is submitted to the said pressure by means of a calibrated outflow channel or restriction outlet introducing a delay in the establishment of the pressure.

In an advantageous manner the surface of the assembly in communication with the restriction outlet is smaller than the surface directly sensitive to the pressure of the chamber, the remainder of the surface being in communication with a volume at low pressure, notably atmospheric.

Thus, the supply line under pressure of the device communicates directly with one, or preferably two distinct chambers one of which contains a valve and the other this pressure-sensitive moveable assembly which can act mechanically against this valve. The moveable assemby consists of two bellows, pistons or membranes, preferably concentric and placed one within the other, and hermetically sealed one from the other. One, for example, the smaller of the two, is mounted on the end of a control rod which, passing from one chamber into the other, can come to act on the head of the valve attached to the tire.

Lastly, the device is equally characterized by the existence of a calibrated outflow channel or restriction outlet which links the internal volume of the bellows mounted on the control rod, to the chamber, or one of the chambers, for example the chamber containing the valve.

This outlet which delays the fall in the pressure under this bellows, facilliitates the rapid closing of the valve when the pressure is released from the supply line.

The invention will be better understood during the description of an example of an embodiment of the invention which conforms to the attached drawing.

BRIEF DESCRIPTION OF THE DRAWING

The single FIGURE is a schematic cross-sectional view the pressure regulating device of the present invention.

DETAILED DESCRIPTION OF THE PREFERRED EMBODIMENT

As represented, the device includes a rigid body 1, made, for example, from several elements which might be obtainable by molding and which furnish flat joining planes faciliitating sealing by simple stamp jointing. The interior of the body contains two chambers 2 and 3, both directly connected to the inlet channel 11.

Chamber 3 may communicate with the exterior by means of a valve 5. The valve 5 includes, in a known manner, a valve head 9, held against a seat 51 by a compression spring 52. The valve head 9 has a stem 90 which extends into the chamber 3.

In chamber 2, a first bellows 7, with a useable surface $S_c$, is fitted into a circular recess 12. This bellows concentrically covers a second bellows 14 whose surface $s_c$ is smaller and is fitted into circular recess of corresponding diameter. The seal around these two bellows is obtained using tin solder 17.

In the center of the bellows 14, the wall which separates the chambers 2 and 3 has a hole in it so as to leave a passage, sliding, for the cylindrical rod 8.

The end 81 of this rod, on the chamber 3 end, is fitted with a cup 82 which can come to press down on the body of the valve 5, and thus serve as a stop to limit the travel of the bellows. The rod 8 has an adequate length such that its end 81 being in contact with the the stem 90 on the valve head 9 of the valve 5, its other end 80 is, except for a slight gap, at the level of the internal surface of the bottom of the bellows. By this arrangement, the bottoms of the two bellows being practically in contact with each other, any movement of the bellows 7 will be relayed to the position of the valve head 9, the consequence of the opening of which is that the inlet conduit 11 and outlet conduit 50 communicate freely. A calibrated outflow channel or restriction outlet 15 links the internal volume 16 of the bellows 14 with the chamber 3. The size of this outlet is not critical, it is sufficient for the correct functioning of the device that the constant of discharge time for the volume 16 is significantly longer than for the cavity 2 through the inlet conduit 11. It should be noted that this delayed outflow may be obtained simply by the play between the control rod 8 and its guide bore 18.

The functioning of the device is as follows:

When the inlet channel 11 is purged, that is, at atmospheric pressure, the bellows 7 and 14 are relaxed and the valve 5 is closed by the double action of the spring 52 and the pressure $P_n$ within the tire.

The volume 4 within the bellows 7 is, by construction, at atmospheric pressure. The travel possible between the stop 82 and the body of the valve 5 being reduced, the elevation of the pressure within this bellows 7, in the compressed state, is negligeable.

(a) the forces tending to open the valve:
  $S_c \cdot P_c$ and $s_v \cdot P_c$ ($s_v$ being the surface of the valve head 9 on the chamber 3 side)
(b) the forces tending to close the valve:
  $s_c \cdot P_c$ and $S_v \cdot P_n$ ($S_v$ being the surface of the valve head 9 on the tire side)

For the valve to open, the following relationship must be satisfied:

$$(S_c + s_v) P_c > s_c \cdot P_c + S_v \cdot P_n$$

neglecting the force of the spring 52 and the elasticity of the bellows.

In practice, the surfaces $S_v$ and $s_v$ may be considered as equal, and the ratio to be respected between the surfaces of the valve $S_v$ and the bellows ($S_c - s_c$) should approximately correspond to the ratio between the maximum and minimum pressures of the tire one wishes to control. This occurs because, from the above relationship:

$$P_c > \frac{S_v}{S_c - s_c + s_v} P_n.$$

And where $S_v$ is approximately equal to $s_v$, a threshold pressure $P_t$ to open the valve is:

$$P_t \approx P_n / (1 + (S_c - s_c)/s_v).$$

The valve being thus opened by the threshold pressure $P_t$, for the pressure $P_c$ in the chambers 2 and 3, it is sufficient to increase (i.e. $P_c > P_n > P_t$) or decrease (i.e. $P_n > P_c > P_t$) this pressure to the desired value to inflate or deflate the tire.

Because of the action of the bellows, the valve remains open as long as the pressures in the tire and in the inlet channel are equal and greater than $P_t$.

Once the tire is at the desired pressure P, the supply channel 11 is quickly purged. The residual pressure P within the bellows 14 slowly decreases via the restriction outlet 15 into the channel 11, the bellows 14 pushes against the bellows 7 which favors the closing of the valve 5. A leak at the level of the bellows 7 and or 14 will not cause a loss of pressure from the tire since such a leak would not affect the normal functioning of the valve 5.

The device of the invention finds its application on all vehicles and particularly heavy civilian or military ones.

The device may be the object of variations:

For example, instead of two chambers 2 and 3, there may be only one which would contain the double bellows and the head of the valve 5.

Or, for the bellows could be substituted other moveable pressure-sensitive organs, such as membranes.

Or again, the restriction outlet 15 could link the volume 16 with either of the chambers 2, 3 or with one solitary chamber, for example simply by a small hole through the wall of the bellows.

We claim:

1. A device to regulate the pressure of a tire on a moving vehicle by use of an exterior pressure supply, of the kind including;
   an inlet channel linked to the exterior pressure supply,
   an outlet channel on the tire in communication with said inlet channel,
   a valve head disposed in said outlet channel which is subject on opposite sides to the pressures of said inlet channel and said outlet channel and which normally closes said outlet channel,
   an actuating means responding to the pressure introduced in the inlet channel by the exterior pressure supply for moving the said valve head to open it, characterized in that the said actuating means includes,
   (a) a chamber directly communicating with the said inlet channel,
   (b) a movable assembly in said chamber having on one side a surface ($S_c$) directly subjected to the pressure of the said chamber and on the other side a surface ($s_c$) subjected to the said pressure in said inlet channel through a restriction channel means for introducing a delay in the establishment of the inlet channel pressure thereat relative to the one side.

2. The device according to claim 1, wherein the surface ($s_c$) of the assembly in communication with the restriction channel means is smaller than the surface ($S_c$) directly sensitive to the pressure of the chamber, the remainder of the surface ($S_c - s_c$) being in communication with a volume at low pressure, of about atmospheric.

3. The device according to claim 2, wherein the inlet channel communicates directly with a second chamber containing the head of the valve.

4. The device according to claim 3, wherein the restriction channel means opens into the said second chamber.

5. The device according to claim 1, wherein the moveable assemby includes two bellows.

6. The device according to claim 5, wherein the two bellows are disposed concentrically, one within the other, and hermetically sealed one from the other, one of the bellows is mounted on the end of a control rod which acts mechanically on the head of the valve.

* * * * *